United States Patent [19]
Thais et al.

[11] 3,751,076
[45] Aug. 7, 1973

[54] COLLET HOSE BRACKET

[75] Inventors: James W. Thais, Decatur; Donald E. Daykin, Taylorville, both of Ill.

[73] Assignee: Caterpillar Tractor Co., Peoria Ill.

[22] Filed: Dec. 10, 1971

[21] Appl. No.: 206,780

[52] U.S. Cl. ............... 285/62, 285/137 R, 285/257
[51] Int. Cl. ............................................... F16l 3/00
[58] Field of Search ............................. 248/49, 73; 285/137 R, 61, 62, 243, 246, 248, 249, 255, 257, 322, 323, 63, 64, 419; 137/344

[56] References Cited
UNITED STATES PATENTS

| 3,325,194 | 6/1967 | Grawey | 285/322 X |
| 2,519,203 | 8/1950 | Stoecklin | 285/61 |
| 3,125,359 | 3/1964 | Charles | 285/137 R X |
| 3,279,827 | 10/1966 | Brown | 285/137 R X |

FOREIGN PATENTS OR APPLICATIONS

| 158,642 | 2/1921 | Great Britain | 285/243 |

Primary Examiner—Dave W. Arola
Attorney—Joseph L. Strabala et al.

[57] ABSTRACT

A collet hose bracket includes a central metal conduit structure which can be physically clamped to adjacent machine structures and a pair of collet hose couplings attached to each end thereof, whereby high pressure flexible hoses can be tethered in the area of articulated hitches and the like of earthmoving equipment where there is danger of environmental damage to such hoses and therefore a necessity to tether them.

1 Claim, 5 Drawing Figures

PATENTED AUG 7 1973
3,751,076
SHEET 2 OF 2
Fig-3-
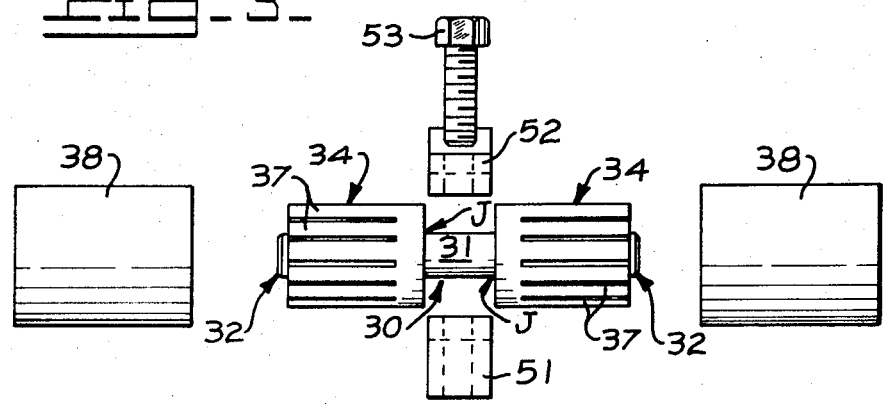
Fig-4-
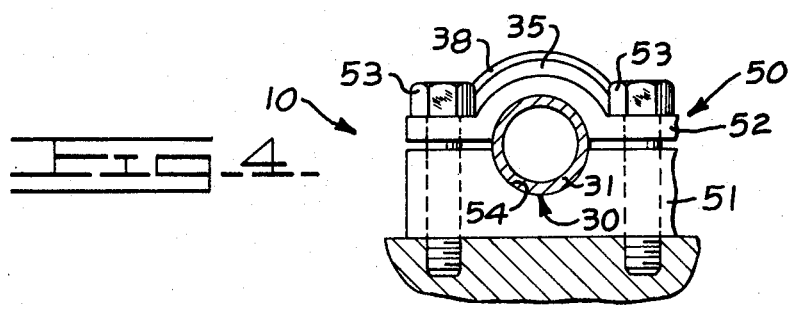
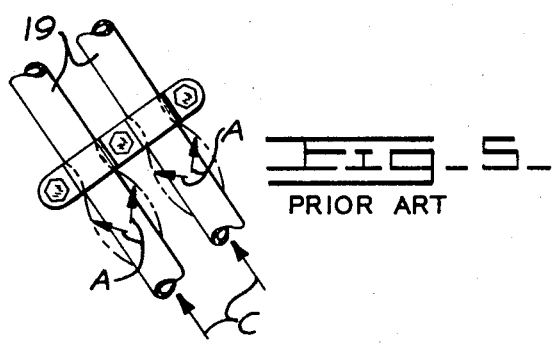
Fig-5-
PRIOR ART

COLLET HOSE BRACKET

BACKGROUND OF THE INVENTION

High pressure wire reinforced flexible hydraulic hose is often used in earthmoving vehicles to connect the several parts of hydraulic circuitry on different parts of the machine. For example, often common hydraulic circuits are contained on both halves of articulated vehicles and it is necessary to interconnect them with flexible hydraulic hose so that the several parts of the machine can move relative to each other. The high pressure hydraulic hoses employed across the hitch mechanism between a conventional two-wheel tractor and scraper combination, such as shown in U.S. Pat. No. 3,311,389, issued to Barton et al., are amply illustrative of the environment where the collet hose bracket is designed to be used, and is the environment in which the invention will be described, though its application is not limited thereto.

In the scraper environments mentioned above, the hydraulic high pressure flexible hose must be tethered to prevent its inadvertent contact or engagement with the moving parts of the hitch mechanism during articulation or other movements of the hitch resulting from either movement of the hitch or hose movement, caused by pressures and surges therein. Clamping and/or strapping these flexible hydraulic hoses to adjacent structures to prevent their inadvertent entanglement in the hitch mechanism have often contributed to the filure of the hose because of the tendency of these hoses to grow both linearly and radially when pressurized, especially during pressure surges, which prevents these hoses from being tightly clamped; and if they are not tightly clamped, they will move within the clamp leading to wear and subsequent failure.

Therefore it is an object of the current invention to provide an improved collet type bracket for tethering flexible hydraulic hose which overcomes many of the difficulties experienced with prior art clamping devices.

SUMMARY OF THE INVENTION

Other objects and advantages of this invention will become apparent from the description of the novel collet bracket which includes a hollow conduit member having a central portion and an integral stem portion at each end thereof, a pair of cylindrical collets having a radial wall at one end with a central stem aperture in its radial wall and a plurality of axially extending fingers extending from the periphery of the radial wall formed by axial slots, with one of said collets coaxially assembled on each end of the conduit member in a spaced relationship so their fingers encircle their associated stem portion and the collets being fixedly joined to the conduit member in the stem aperture, a pair of sleeve members each having a stepped bore connected with a ramp portion adapted to be assembled with a cylindrical collet to force its fingers toward its associated stem portion, and a mounting fixture having an aperture for receiving the central portion of the hollow conduit member for attaching the unit to adjacent machine structures for tethering high pressure hydraulic hose connected to its opposite ends.

BRIEF DESCRIPTION OF THE DRAWINGS

FIG. 3 is an exploded view of the collet bracket illustrated in FIG. 1;

FIG. 4 is a sectional view of the collet bracket along lines IV—IV of FIG. 2; and FIG. 5 is a prior art clamping bracket for high pressure hydraulic hose in similar environments.

DESCRIPTION OF A PREFERRED EMBODIMENT

Figure 1:
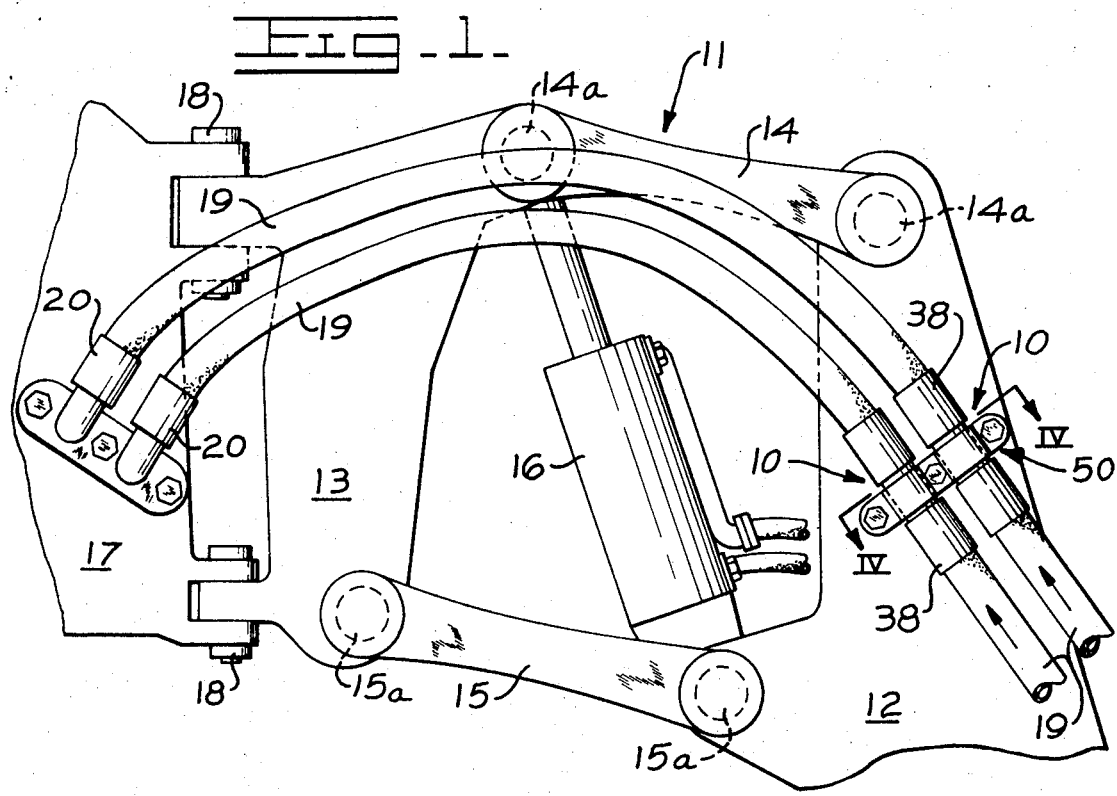
FIG. 1 is a broken-away elevation of a hitch assembly between a two-wheeled tractor and a scraper, illustrating two high pressure hydraulic hoses extending thereacross and intermediately tethered with the novel collet bracket.

In FIG. 1 two novel collet brackets 10 are illustrated in a hydropneumatic scraper hitch assembly 11 which allows both vertical movement and articulated movement between the tractor and scraper combination more fully shown in U.S. Pat. No. 3,311,389, issued to Barton et al. In such a hitch, an A-frame 12 is pivoted horizontally on the tractor (not shown) and connected to an intermediate hitch member 13 through upper links 14 and lower links 15 with horizontal pivot pin connections 14a and 15a, respectively, in a manner that the intermediate hitch member can move vertically under the control of jack 16 diagonally disposed between pivot pin connections. The intermediate hitch member is connected to a gooseneck structure 17 of the scraper through a vertical pivot connection 18 which allows articulation between the tractor and scraper. As can be seen in FIG. 1, a pair of high pressure hydraulic flexible hoses 19, which are typical of those employed to connect common hydraulic circuits on the tractor with those on the scraper are shown traversing the hitch assembly, and it can be appreciated that these hoses must accommodate the full range of movements in the hitch assembly described above.

If these high pressure hoses were not tethered between their connection on the tractor and the fittings 20 on the gooseneck structure of the scraper, they would most likely foul in the moving parts of the hitch mechanisms. Clamping the hoses tight enough to prevent their movement along the hose axis, as illustrated in FIG. 5, can cause "ballooning" (see arrows A) on the upstream (pressure) side of the clamp as well as upset the uniform stress pattern in the wire reinforcing in the hose structure, that leads to rupture, due to a lack of stress uniformity and radial growth of the hose under pressure surges within the hose body. In turn, loosely clamping these hoses will often allow them to "work" in the clamp due to axial movement along the hose axis (see arrows C) as the hose lengthens and contracts under the influences of pressure changes within the hose body. Also the hose will tend to rotate within the clamp under various torsional loading as the tractor and scraper articulate relative to one another in a "loose" clamp causing unnecessary wear. Thus the prior art tethering techniques are not very satisfactory in such environments and often cause hose failure in the hitch assembly and like environments, which can spray high pressure, hot oil over a large area, endangering the operator of such equipment.

By contrast the instant invention eliminates the abuse of hose structures where they are tethered in such environment by providing a special collet bracket 10 which is designed to be secured directly to adjacent structures in order to provide a suitable tether for such hoses. By referring to FIGS. 2 and 3 where the collet bracket 10 is best illustrated, its hollow cylindrical conduit 30 is shown having a central portion 31 with identical integral stem portions 32 at its opposite ends. Having grooves 33 in the outer surfaces of these stem portions assist in holding the internal hose structure on the opposite ends of the bracket. The central portion 31 of the cylindrical conduit can assume various configurations, such as curves or U-shaped configurations since its physical configuration is not critical. Assembled on this cylindrical conduit are a pair of collet members 34, each having a radial wall portion 35 with a stem aperture 36 centrally formed therein so that it can be telescoped over a stem portion at an end of the hollow conduit and secured to the conduit member where the stem portion joins the central portion. Extending from the periphery of the radial wall portion in one direction, encircling its stem portion, are a plurality of axially extending fingers 37 which can be formed in the cylindrical collet by a plurality of slots extending from one end thereof and terminating adjacent to the radial wall of the collet. When these collets are assembled on the cylindrical conduit they can be fixedly joined thereto at their junction J with the central portion of the conduit member by brazing, welding the like, the-like, so that there cylindrical disposed fingers will encircle their associated stem portion, leaving the central portion 31 of the cylindrical member unobstructed.

Figure 2:
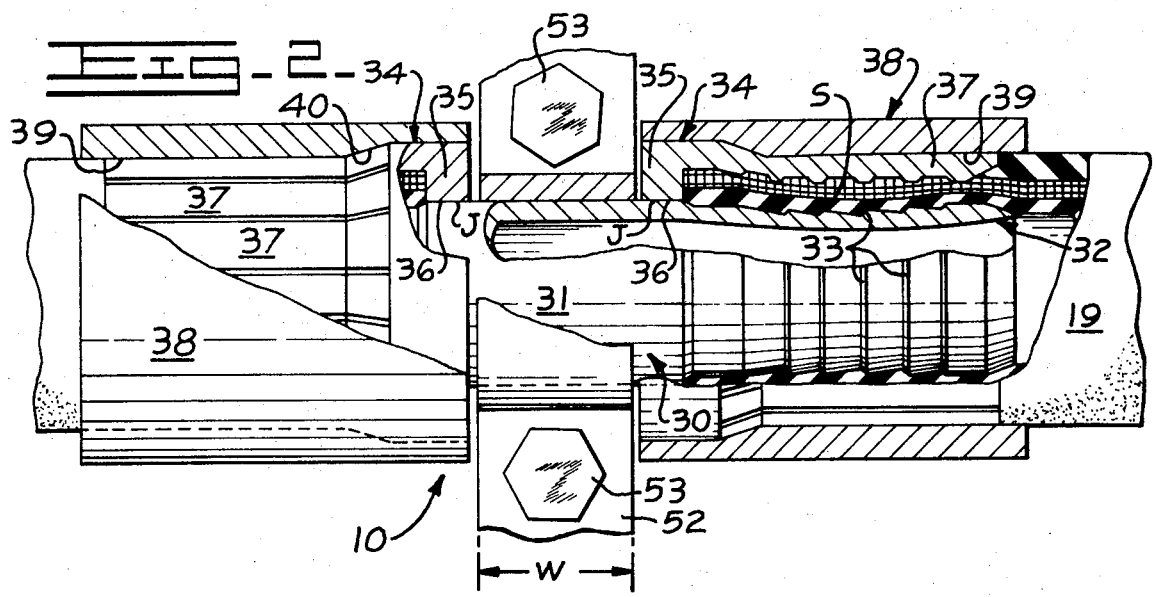
FIG. 2 is an elevation of the collet bracket shown in FIG. 1, with parts broken away to show additional detail.

As described, the outer surface of each collet 34 will be cylindrical when assembled on the hollow conduit 30 so there will be a space between their fingers 37 delineated by the plurality of axial slots in the cylindrical wall of the collet and their encircled stem portion. As a result of this arrangement a skived end S of a hydraulic hose 19 can be pushed on the stem so that it will pass under the fingers 37 of the collet until its end abuts against the radial wall 35 as can be seen in FIG. 2. Thereafter a sleeve 38, having a stepped bore 39 with the bores connected by a conical or ramped portion 40 which previously was placed on the hose end can be forced on each collet member to drive its fingers radially towards the stem to grip the skived end S of the hose. Thus each of the high pressure hydraulic hoses 19 is separated and then has its ends rejoined with the collet bracket 10, according to the above described procedures. It can be appreciated that these collet brackets can be assembled in any intermediate portions of hose precisely during the manufacturing thereof whereby errors in tethering the hoses on assemblies, such as a scraper hitch described above will be avoided for improved quality control.

Each sleeve 38 is designed so that its coaxially aligned bores are in essentially a parallel relationship with the stem's outer surface and the bores are sized so that its larger diameter bore will snuggly fit the periphery of the radial wall portion 35 of the collet 30 on which it is assembled and so its smaller bore will radially drive the individual fingers 37 of each collet towards their associated stem portion, with the slots between these fingers allowing them to collapse radially to grip the skived end S of the hoses 19 assembled on the respective stem portion of a bracket. The ramp portion 40 between the stepped bores will cause the fingers to be driven progressively inward toward the stem which should be malleable to allow slight deformation as the sleeve is installed by axially advancing it on the collet as this will insure maximum gripping action of the skived end of the hose without damaging the integrity of the reinforcing wires of the hydraulic hose. The gripping action accomplished by each end of the collet bracket is similar to that described in U.S. Pat. No. 3,325,194, issued to Grawey and reference is made to this patent with respect to this gripping action and incorporated herein.

As indicated above, the central portion 31 of the conduit 30 is unobstructed between the radial walls 35 of the collets 34 which are fixedly joined on the opposite ends of this conduit. Since this portion is essentially a metal tube it can be secured with a mounting fixture 50 which includes a spacer member 51 and a strap member 52 which are secured to one another by tap bolts 53 which pass therethrough and into threaded bores in the adjacent machine structures to which the bracket is to be attached. An aperture 54 is provided in the mounting fixture whose width W is less than the space between the radial walls 35 mounted on the conduit so that its central portion can be received in this aperture. This central portion can be clamped tightly in the aperture so that it is held immobile against radial or axial movement or alternatively can be loosely held to allow rotational movement of the conduit within the mounting fixture, so that torsional loads on the hydraulic hose can be dissipated over the full length of the hose on both sides of the bracket. Generally if this rotational movement is desired in the bracket a bearing structure would be formed (not shown) in the middle of the central portion of the hollow conduit 30 so that this movement can be accommodated without allowing the radial walls of the collet to axially abut against the opposite sides of the mounting fixture, which could occur with considerable force due to the axial growth and contraction of the high pressure hydraulic hose under pressure variations. The spacer member is sized to keep the sleeves 38 on each end of the bracket clear of the adjacent structures and to provide a slight standoff of the hydraulic hose in the area of the tethering accomplished by the new bracket.

We claim:

1. A collet hose bracket for tethering high pressure reinforced hose comprising:

a hollow conduit member having a central portion and integral stem portions at each end of said central portion;

a pair of cylindrical collets, each collet having a radial wall with a central stem aperture and a plurality of circumferentially disposed fingers extending axially from the outer periphery of its radial wall, with said collets telescoped over said stem portions and fixedly joined to said central portion in spaced relationship so their fingers encircle their associated stem portion leaving an annular space therebetween;

a pair of sleeve members, each of said sleeve members having a stepped bore connected with a conical ramp portion, said sleeve members adapted to be received over said collet members and operable to drive said fingers of its associated collet member toward their associated stem portion to grip a skived end of a reinforced hose inserted on its stem portion in said annular space when said sleeve member is assembled thereon in a telescoped relationship; and a mounting means adapted to secure the central portion of said hollow conduit for attaching the collet hose bracket to adjacent machinery structures to tether high pressure reinforced hose connected thereto, said mounting means including a stand-off member operable to support said collet hose bracket in spaced relationship relative to adjacent machinery and clamping means operable to secure said central portion of the hollow conduit against both rotational and axial movement with reference to said mounting means, said clamping means including a semi circular notch in said stand-off member and a cap member, said cap member having a cooperating semi circular notch between which notches said central portion of said hollow conduit is received and bolt means extending through said cap member and said stand-off member operable to urge said cap toward said stand-off member thereby achieving a positive clamping action and securing the mounting means on adjacent machinery structures, said notches being sized so said central portion of said hollow conduit inserted therebetween locates the entire cap member in a spaced relationship with reference to said stand-off member.

* * * * *